(12) United States Patent
Gubser

(10) Patent No.: US 9,025,622 B1
(45) Date of Patent: May 5, 2015

(54) LOSSLESS RECURSIVE DECONSTRUCTION AND RECONSTRUCTION OF DIGITAL INFORMATION DATA STREAMS

(76) Inventor: David Ronald Gubser, Hamilton City, CA (US)

( * ) Notice: Subject to any disclaimer, the term of this patent is extended or adjusted under 35 U.S.C. 154(b) by 869 days.

(21) Appl. No.: 12/931,317

(22) Filed: Jan. 27, 2011

(51) Int. Cl.
*H04J 3/24* (2006.01)
*H04L 29/06* (2006.01)

(52) U.S. Cl.
CPC .................................. *H04L 29/0653* (2013.01)

(58) Field of Classification Search
None
See application file for complete search history.

(56) References Cited

U.S. PATENT DOCUMENTS 8,468,244 B2 * 6/2013 Redlich et al. ................ 709/225
8,677,505 B2 * 3/2014 Redlich et al. ................. 726/27

* cited by examiner

*Primary Examiner* — Rhonda Murphy

(57) ABSTRACT

A series of methodologies and mathematical formulas that deconstructs any input digital information data stream whereby the deconstructed output data stream, in all cases, uses less digital storage or transmission space than the original data stream. The methodologies and formulas can be used recursively to further reduce the digital output stream size as many times as necessary to achieve a desired digital output stream size, limited only by the requirement there is a small set of deconstruction output stream values remaining to enable reconstruction. The output stream may be stored, transmitted or added to additional output streams for further reduction. The deconstruction output stream may be modified during or after deconstruction completion to render the deconstructed output stream incomprehensible as desired by the deconstructed output stream owner or creator.

2 Claims, 7 Drawing Sheets

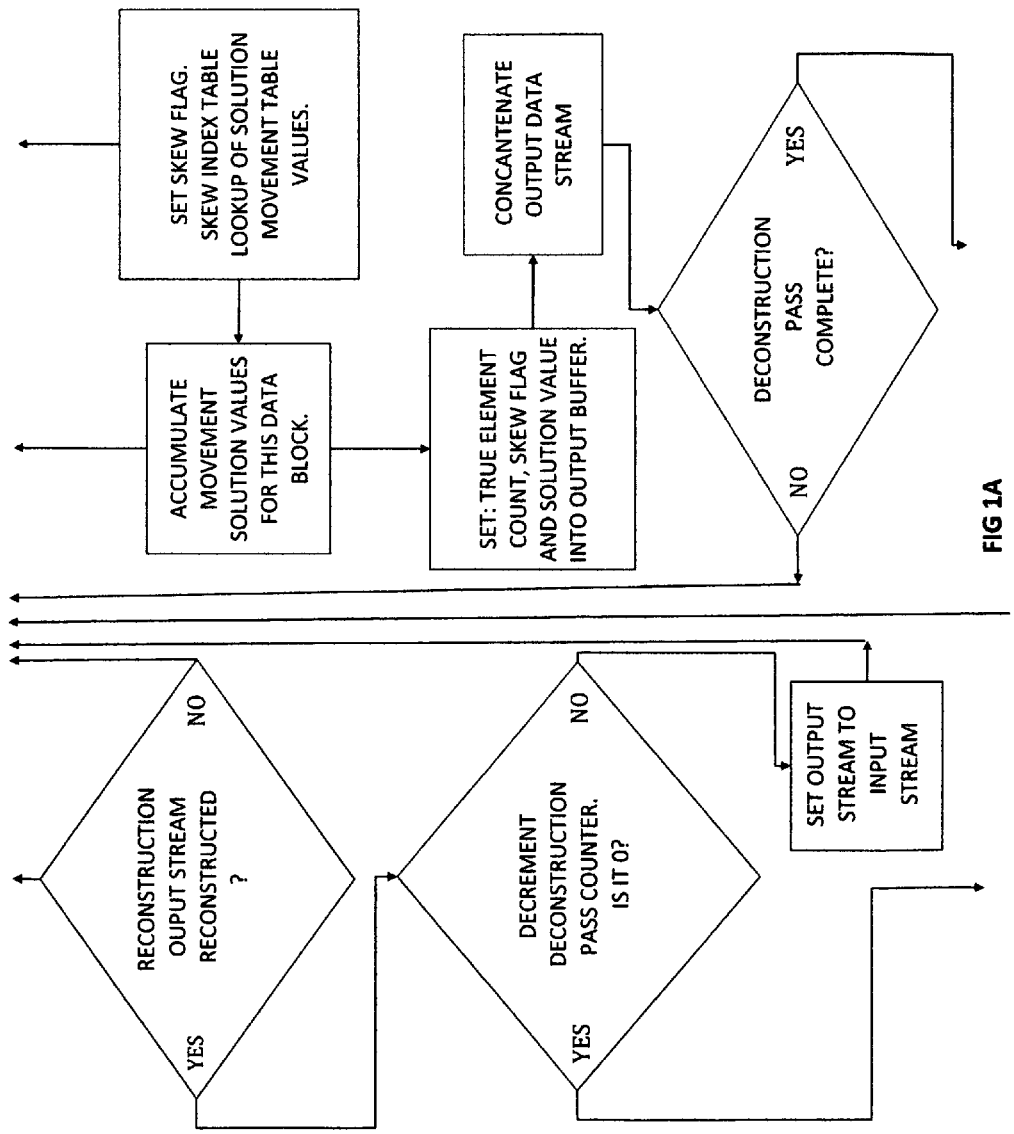

| | 1 | 2 | 3 | 4 | 5 | 6 | 7 | 8 |
|---|---|---|---|---|---|---|---|---|
| 0 | 1 | | | | | | | |
| 1 | 1 | 2 | | | | | | |
| 2 | 2 | 5 | 3 | | | | | |
| 3 | 3 | 9 | 9 | 4 | | | | |
| 4 | 4 | 14 | 19 | 14 | 5 | | | |
| 5 | 5 | 20 | 34 | 34 | 20 | 6 | | |
| 6 | 6 | 27 | 55 | 69 | 55 | 27 | 7 | |
| 7 | 7 | 35 | 83 | 125 | 125 | 83 | 35 | 8 |
| 8 | 8 | 44 | 119 | 209 | 251 | 209 | 119 | 44 |
| 9 | 9 | 54 | 164 | 329 | 461 | 461 | 329 | 164 |
| 10 | 10 | 65 | 219 | 494 | 791 | 923 | 791 | 494 |
| 11 | 11 | 77 | 285 | 714 | 1,286 | 1,715 | 1,715 | 1,286 |
| 12 | 12 | 90 | 363 | 1,000 | 2,001 | 3,002 | 3,431 | 3,002 |
| 13 | 13 | 104 | 454 | 1,364 | 3,002 | 5,004 | 6,434 | 6,434 |
| 14 | 14 | 119 | 559 | 1,819 | 4,367 | 8,007 | 11,439 | 12,869 |
| 15 | 15 | 135 | 679 | 2,379 | 6,187 | 12,375 | 19,447 | 24,309 |
| 16 | 16 | 152 | 815 | 3,059 | 8,567 | 18,563 | 31,823 | 43,757 |
| 17 | 17 | 170 | 968 | 3,875 | 11,627 | 27,131 | 50,387 | 75,581 |
| 18 | 18 | 189 | 1,139 | 4,844 | 15,503 | 38,759 | 77,519 | 125,969 |
| 19 | 19 | 209 | 1,329 | 5,984 | 20,348 | 54,263 | 116,279 | 203,489 |
| 20 | 20 | 230 | 1,539 | 7,314 | 26,333 | 74,612 | 170,543 | 319,769 |
| 21 | 21 | 252 | 1,770 | 8,854 | 33,648 | 100,946 | 245,156 | 490,313 |
| 22 | 22 | 275 | 2,023 | 10,625 | 42,503 | 134,595 | 346,103 | 735,470 |
| 23 | 23 | 299 | 2,299 | 12,649 | 53,129 | 177,099 | 480,699 | 1,081,574 |
| 24 | 24 | 324 | 2,599 | 14,949 | 65,779 | 230,229 | 657,799 | 1,562,274 |
| 25 | 25 | 350 | 2,924 | 17,549 | 80,729 | 296,009 | 888,029 | 2,220,074 |
| 26 | 26 | 377 | 3,275 | 20,474 | 98,279 | 376,739 | 1,184,039 | 3,108,104 |
| 27 | 27 | 405 | 3,653 | 23,750 | 118,754 | 475,019 | 1,560,779 | 4,292,144 |
| | | | 4,059 | 27,404 | 142,505 | 593,774 | 2,035,799 | 5,852,924 |
| | | | | 31,464 | 169,910 | 736,280 | 2,629,574 | 7,888,724 |
| | | | | | 201,375 | 906,191 | 3,365,855 | 10,518,299 |

FIG 2

| | | | | FIG 2B |
|---|---|---|---|---|
| 28 | 28 | 434 | 4,494 | |
| 29 | 29 | 464 | 4,959 | 35,959 |
| 30 | 30 | 495 | | |
| 31 | 31 | | | |

FIG 3

| //    | 1    | 2    | 3    | 4    | 5    | 6    | 7    | 8    | 9    | 10   | 11   | 12   | 13   | 14   | 15   |
|-------|------|------|------|------|------|------|------|------|------|------|------|------|------|------|------|
| 0,0, //0 | 1,0, 1 | 1,1, 2 | 2,0, 3 | 1,2, 4 | 2,1, 5 | 2,2, 6 | 3,0, 7 | 1,3, 8 | 2,3, 9 | 2,4, 10 | 3,1, 11 | 2,5, 12 | 3,2, 13 | 3,3, 14 | 4,0, 15 |
| 1,4, //16 | 2,6, 17 | 2,7, 18 | 3,4, 19 | 2,8, 20 | 3,5, 21 | 3,6, 22 | 4,1, 23 | 2,9, 24 | 3,7, 25 | 3,8, 26 | 4,2, 27 | 3,9, 28 | 4,3, 29 | 4,4, 30 | 5,0, 31 |
| 1,5, //32 | 2,10, 33 | 2,11, 34 | 3,10, 35 | 2,12, 36 | 3,11, 37 | 3,12, 38 | 4,5, 39 | 2,13, 40 | 3,13, 41 | 3,14, 42 | 4,6, 43 | 3,15, 44 | 4,7, 45 | 4,8, 46 | 5,1, 47 |
| 2,14, //48 | 3,16, 49 | 3,17, 50 | 4,9, 51 | 3,18, 52 | 4,10, 53 | 4,11, 54 | 5,2, 55 | 3,19, 56 | 4,12, 57 | 4,13, 58 | 5,3, 59 | 4,14, 60 | 5,4, 61 | 5,5, 62 | 6,0, 63 |
| 1,6, //64 | 2,15, 65 | 2,16, 66 | 3,20, 67 | 2,17, 68 | 3,21, 69 | 3,22, 70 | 4,15, 71 | 2,18, 72 | 3,23, 73 | 3,24, 74 | 4,16, 75 | 3,25, 76 | 4,17, 77 | 4,18, 78 | 5,6, 79 |
| 2,19, //80 | 3,26, 81 | 3,27, 82 | 4,19, 83 | 3,28, 84 | 4,20, 85 | 4,21, 86 | 5,7, 87 | 3,29, 88 | 4,22, 89 | 4,23, 90 | 5,8, 91 | 4,24, 92 | 5,9, 93 | 5,10, 94 | 6,1, 95 |
| 2,20, //96 | 3,30, 97 | 3,31, 98 | 4,25, 99 | 3,32, 100 | 4,26, 101 | 4,27, 102 | 5,11, 103 | 3,33, 104 | 4,28, 105 | 4,29, 106 | 5,12, 107 | 4,30, 108 | 5,13, 109 | 5,14, 110 | 6,2, 111 |
| 3,34, //112 | 4,31, 113 | 4,32, 114 | 5,15, 115 | 4,33, 116 | 5,16, 117 | 5,17, 118 | 6,3, 119 | 4,34, 120 | 5,18, 121 | 5,19, 122 | 6,4, 123 | 5,20, 124 | 6,5, 125 | 6,6, 126 | 7,0, 127 |
| 1,7, //128 | 2,21, 129 | 2,22, 130 | 3,35, 131 | 2,23, 132 | 3,36, 133 | 3,37, 134 | 4,35, 135 | 2,24, 136 | 3,38, 137 | 3,39, 138 | 4,36, 139 | 3,40, 140 | 4,37, 141 | 4,38, 142 | 5,21, 143 |
| 2,25, //144 | 3,41, 145 | 3,42, 146 | 4,39, 147 | 3,43, 148 | 4,40, 149 | 4,41, 150 | 5,22, 151 | 3,44, 152 | 4,42, 153 | 4,43, 154 | 5,23, 155 | 4,44, 156 | 5,24, 157 | 5,25, 158 | 6,7, 159 |
| 2,26, //160 | 3,45, 161 | 3,46, 162 | 4,45, 163 | 3,47, 164 | 4,46, 165 | 4,47, 166 | 5,26, 167 | 3,48, 168 | 4,48, 169 | 4,49, 170 | 5,27, 171 | 4,50, 172 | 5,28, 173 | 5,29, 174 | 6,8, 175 |
| 3,49, //176 | 4,51, 177 | 4,52, 178 | 5,30, 179 | 4,53, 180 | 5,31, 181 | 5,32, 182 | 6,9, 183 | 4,54, 184 | 5,33, 185 | 5,34, 186 | 6,10, 187 | 5,35, 188 | 6,11, 189 | 6,12, 190 | 7,1, 191 |
| 2,27, //192 | 3,50, 193 | 3,51, 194 | 4,55, 195 | 3,52, 196 | 4,56, 197 | 4,57, 198 | 5,36, 199 | 3,53, 200 | 4,58, 201 | 4,59, 202 | 5,37, 203 | 4,60, 204 | 5,38, 205 | 5,39, 206 | 6,13, 207 |
| 3,54, //208 | 4,61, 209 | 4,62, 210 | 5,40, 211 | 4,63, 212 | 5,41, 213 | 5,42, 214 | 6,14, 215 | 4,64, 216 | 5,43, 217 | 5,44, 218 | 6,15, 219 | 5,45, 220 | 6,16, 221 | 6,17, 222 | 7,2, 223 |
| 3,55, //224 | 4,65, 225 | 4,66, 226 | 5,46, 227 | 4,67, 228 | 5,47, 229 | 5,48, 230 | 6,18, 231 | 4,68, 232 | 5,49, 233 | 5,50, 234 | 6,19, 235 | 5,51, 236 | 6,20, 237 | 6,21, 238 | 7,3, 239 |
| 4,69, //240 | 5,52, 241 | 5,53, 242 | 6,22, 243 | 5,54, 244 | 6,23, 245 | 6,24, 246 | 7,4, 247 | 5,55, 248 | 6,25, 249 | 6,26, 250 | 7,5, 251 | 6,27, 252 | 7,6, 253 | 7,7, 254 | 8,0, 255 |

LOSSLESS RECURSIVE DECONSTRUCTION AND RECONSTRUCTION OF DIGITAL INFORMATION DATA STREAMS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF INVENTION

In 1948, Claude Shannon published a mathematically based theorem, "A Mathematical Theory of Communication." which became the basis for determining compressibility limits in digital compression and encryption systems design. The theorem quantified the mathematical determination of data entropy. Data entropy occurs when information is manipulated to shorten its transmission or storage needs which does not reproduce the original information exactly, in original form, when received or retrieved. State of the art compression and encryption technologies still use Shannon's data entropy theory and mathematical proof as the guide for lossless compression and encryption implementation. Shannon's theorem is correct, only if it is assumed; the original information must be contained in the data stream during transmission/reception, storage or retrieval.

Current state of the art compression technologies tokenize random digital data streams (digital information arrays whereby the information content may include any combination, in any order, of binary 1s and 0s) statistically creating a tokenization table(s) or dictionaries whereby the most frequently occurring parts of a data stream are cross referenced and given a smaller definition, thereby reducing transmission and/or storage size. Encryption systems jumble the original information through mathematical formulas and simple methodologies. Both lossless compression and encryption data streams carry the original data in some manner, transformed in such a way as to render compression and/or encryption. The standard for lossless compression ratios is approximately 3:1 whereby the transmitted or stored information stream size is one third (⅓) of the original data stream size, at best. Encryption technologies appear to always render a larger output data stream than the original data stream by design.

The 3:1 ratio for random data streams (all possible combinations of unordered digital information) cannot be overcome if the original data is carried in the compressed or encrypted information data stream.

This new invention may make reference to a previous patent filed and accepted by the U.S. Patent and Trademark Office, created by the inventor of this new technology:
U.S. Pat. No. 5,838,964
Date of patent: Nov. 17, 1998
Title: Dynamic Numeric Compression Methods
Inventor: David R. Gubser
Appl. No. 494,779

The disclosure of this new invention should be viewed and processed by a United States Citizen familiar with the U.S. laws regarding Category XIII of the United States Munitions List, as it may fall under the lawful guidelines negating export or disclosure outside the United States or to a non-citizen of the United States of America. This invention may also covered by the S.A.F.E ACT of 1999 (Security and Freedom through Encryption) or its' intended function.

The discovery by this inventor of new methodologies/formulas and means of implementation create a unique invention as depicted in the following disclosure.

BRIEF SUMMARY OF INVENTION

The invention does not compress or encrypt random digital information streams. The invention does not tokenize data or generate token tables or dictionaries. The invention does not carry any of the original data stream information in the digital data output stream and therefore is not subject to normal data entropy theory. The definitions of the terms "compression" and "encryption" do not apply to this invention. However, in practical application, the inventions impact on the compression and encryption arts cannot be overstated.

The invention systematically and programmatically deconstructs any random digital data information stream, whereby the resultant output data stream denotes a new, smaller, structured digital memory footprint. This is accomplished by breaking the incoming data stream into uniform, fixed information block sizes and deconstructing those blocks, individually. The resultant smaller blocks of digital information are concatenated in a systematic and uniform manner and can be repeatedly deconstructed until a desired digital output stream size is achieved. The invention works in reverse order by repeatedly reconstructing the digitally deconstructed data stream until the original data is reproduced, exactly.

During the deconstruction process, at any juncture determined appropriate, a tiny fragment of the deconstructed data stream may be modified and used as a key. This type of modification can take place multiple times during any phase of deconstruction and a combination key rendered of any size desired. This process renders the deconstructed output stream practically and technically impossible to reconstruct without said key. Additionally, the deconstruction engine is also "tunable" and able to deconstruct the data stream blocks in any order the user can conceive of and change to a separate "element" type (binary 0s vs. 1s) to deconstruct opposite data types for any data block desired. The engine also has the capability to deconstruct in reverse order, any block of data. These simple methodologies further complicating attempts at ascertaining the original data stream by any means.

Various methodologies and formulas will be discussed in the disclosure, some of which render the output stream incomprehensible by any computational method, by any available technology known to the inventor.

To those familiar with the arts of compression and encryption technologies, the invention, at first glance, would appear to be a compression/encryption technology that recursively compressed digital information streams, which is in effect, impossible due to data entropy. The invention is a grouping of formulas and methodologies that systematically deconstructs any random digital information stream, generating a uniformly smaller, precise "blueprint" of how to reconstruct the original data stream, in all cases. The invention may be thought of as producing "blueprints" of "blueprints", recursively until the desired deconstruction/reconstruction ratio is met.

The invention is/can be implemented in digital software or hardware. The current embodiment of the software deconstruction/reconstruction engine is rendered in computer processor machine code as a dynamic link library (DLL), less than 10,000, (10 k) bytes in size.

The object of the invention is to render lossless, smaller than original, re-constructible digital output data streams which exponentially increases current digital transmission and storage device capabilities, while using less energy to accomplish these tasks and promote the invention of new devices which also use less energy to accomplish the same or greater tasks. A secondary object of the invention, due to the lack of original data in the transmitted or stored output stream, is the rendering of incomprehensible deconstructed digital data streams which are impossible to reconstruct without the original digital data stream creators permission.

BRIEF DESCRIPTION OF THE SEVERAL VIEWS OF THE DRAWING

FIG. 3 is a rendering of a computer memory array, used to increase deconstruction and reconstruction speed as noted in this disclosure: [0030] Section IV, subsection 10.

DETAILED DESCRIPTION OF THE INVENTION

Figure 1:
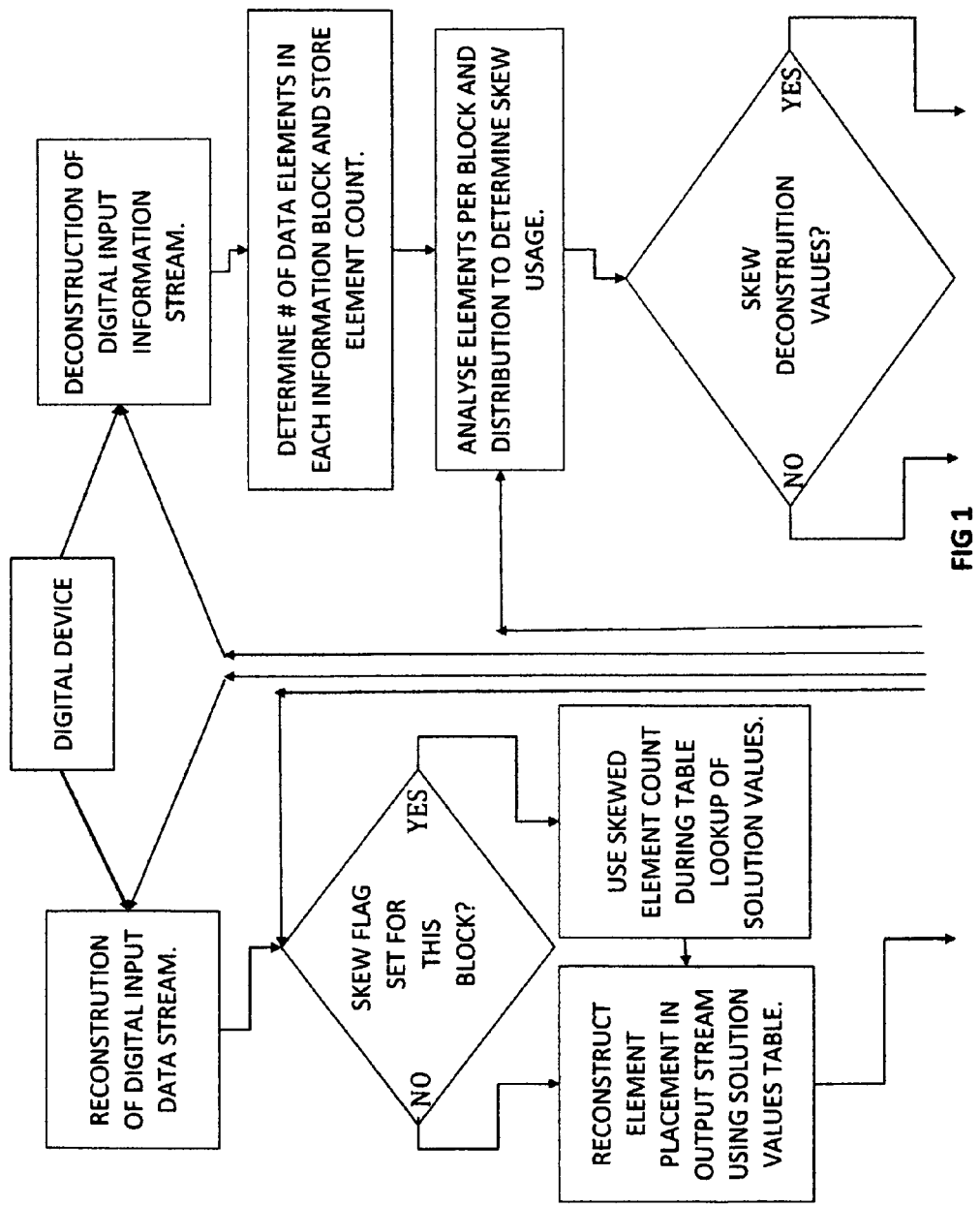
FIG. 1 is a program or "Engine" flowchart depicting the input stream deconstruction; the output stream reconstruction and storage/retrieval, transmitting/receiving of a random digital information stream from a digital device capable of transmitting/receiving or storing/retrieving digital information streams. The flowchart also depicts an abbreviated view of the input/output, processes and decision making branches of the current digital computer program embodiment.
Figure 1B:
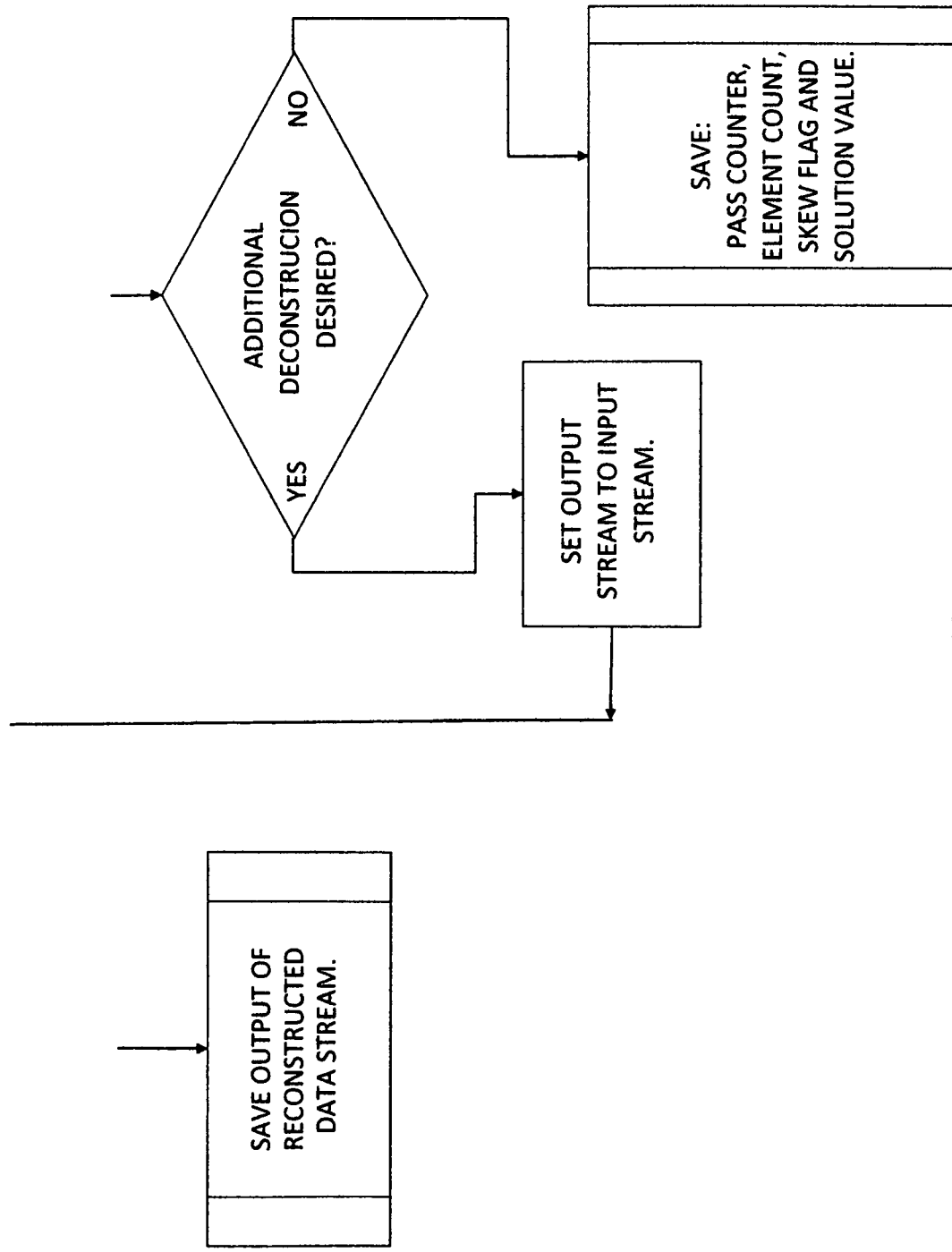

Section I—Element Movement Methodology.
1. For the purpose of clarity, "elements" are described in this disclosure as binary is.
2. A "movement" methodology was created to determine all possibilities or combinations of binary is (elements) in a binary byte. The methodology or "movement" values for 2 (two) elements moving from left to right is outlined as follows:

TABLE 1

| 0 | 1 | 2 | 3 | 4 |
|---|---|---|---|---|
| 11000000 | 10100000 | 0110000 | 10010000 | 0101000 |
| 5 | 6 | 7 | 8 | 9 |
| 00110000 | 10001000 | 0100100 | 0010100 | 00011000 |
| 10 | 11 | 12 | 13 | 14 |
| 10000100 | 01000100 | 00100100 | 00010100 | 00001100 |
| 15 | 16 | 17 | 18 | 19 |
| 10000010 | 01000010 | 00100010 | 00010010 | 00001010 |
| 20 | 21 | 22 | 23 | 24 |

TABLE 1-continued

| 00000110 | 10000001 | 01000001 | 00100001 | 00010001 |
|---|---|---|---|---|
| 25 | | 26 | | 27 |
| 00001001 | | 00000101 | | 00000011 |

Reading the above table and evaluating the location of the single binary 1's denotes the total possible combinations of two (2) is (ones) elements moving through an 8 bit binary array or (Byte) of digital information. There are 28 possible combinations (0 thru 27) of locations for the two binary bits (1s). Note the movements of the elements:

If the trailing (far left) element cannot move, the next element, to the right of it is pushed forward by a movement factor of 1. If the far left element can move, it does, increasing the accumulated movement count by 1, signifying how many movements both elements used to attain their current positions. When the rightmost element is forced to move: (leftmost element cannot move and is blocked by the element in front of it), the rightmost element is move again and the leftmost element is forced to return to its original starting place. The leftmost element is then free to move once again until it is blocked by the rightmost element. When the rightmost element is "bumped" forward or moved to the right, the accumulated movement of both elements is incremented by 1 and the leftmost element, the one doing the bumping is moved to its original position. No additional value is given to the return of the leftmost element to its original position. In this manner, all possible "movements" of the "elements" in an 8 bit (byte) memory array, are accounted for.

Table 2 (below) depicts the same methodology, (abbreviated) noting possible locations of movement, for three elements (binary 1s) moving through an 8 bit binary array. (A digital memory byte.)

TABLE 2

| 0 | 1 | 2 | 3 | 4 |
|---|---|---|---|---|
| 11100000 | 11010000 | 10110000 | 01110000 | 11001000 |
| 5 | 6 | 7 | 8 | 9 |
| 10101000 | 01101000 | 10011000 | 01011000 | 00111000 |
| 10 | 11 | 12 | 13 | 14 |
| 11000100 | 10100100 | 01100100 | 100100100 | 01010100 |
| 15 | | ... | | 55 |
| 00110100 | | ect | | 00000111 |

There are 56 (0-55) possible movement combinations for 3(three) elements moving through the 8 bit memory byte. Using the same methodology, all possible movements or combinations of elements in a byte of memory are depicted in Table 3.

TABLE 3

| Elements or lack thereof (*0) | Combinations possible | Percentage of occurrence |
|---|---|---|
| *0 | 1 | 0.39 |
| 1 | 8 | 3.13 |
| 2 | 28 | 10.94 |
| 3 | 56 | 21.88 |

TABLE 3-continued

| Elements or lack thereof (*0) | Combinations possible | Percentage of occurrence |
|---|---|---|
| 4 | 70 | 27.34 |
| 5 | 56 | 21.88 |
| 6 | 28 | 10.94 |
| 7 | 8 | 3.13 |
| 8 | 1 | 0.39 |
| Totals | 256 | 100 |

There is a noted symmetry to the placement/movement combinations: 3 and 5 elements each have 56 possible combinations of placement/movement. 2 and 6 elements each have 28 possible combinations of placement/movement. 1 and 7 elements each have 8 possible placement/movement combinations. 0 and 8 each have 1 possible placement where no movement is possible. (0 or no elements cannot move: 8 elements have nowhere to move.) 4 elements have 70 possible placement/movement combinations.

The above described placement/combinations imply: Digital information, statistically, given a random data stream of sufficient length, will seek an equilibrium whereby binary 1s and 0s are distributed equally in the stream.

For clarification: Table 4 depicts the symmetry relationship of the probability distribution for 2 (two) dice rolled and secondly: The binary 1s (elements) probability distribution. The bracketed values [ ] define how many ways 2 dice can be rolled to make the value above it. I.E. . . . [6] ways to roll 2 dice to get a value of 7. The second half of the chart depicts how many ways binary 1s. (Elements) can be distributed, according to the movement methodology defined in Section I. I.E. . . . 16 elements, 601,080,389 combinations.

TABLE 4

Random possibilites for two dice [possibilities]

```
                                          7
                                         [6]
                               6                   8
                              [5]                 [5]
                     5                                      9
                    [4]                                    [4]       10
            4                                                       [3]      11
           [3]                                                              [2]      12
   3                                                                                [1]
  [2]
2
[1]
```

Random possibilities in a 4 byte block of raw data

```
                                         16
                                     601,080,389
                              15                  17
                          565,722,719         565,722,719
                    14                                     18
                471,435,599                            471,435,599
            13                                                    19
        347,373,599                                           347,373,599
    12                                                                   20
225,792,839                                                          225,792,839   21
129,024,479                                                                    129,024,479
  ect . . .                                                                      ect . . .
```

The "Solution Values Matrix" (FIG. 2, Drawing) depicts probability distributions for element combinations in a 32 bit, 4 byte linear memory array using the placement/movement methodology outlined in Section I. [0016].

Section II—Solution/Movement Values Table (Matrix) Generation.

Table 4 is a two dimensional matrix/table, programmatically useful in defining element movement combinations.

All value for the 'Solutions Values" table/matrix can be generated systematically (inside the table border lines) by column/row addition as described below. The matrix/solution table can be generated in this manner indefinitely or as desired for a given implementation.

Column 3, row 2[value]=(column 2, row 2 [value])+(column 3, row 1 [value]+1 I.E. . . . 5=2+2+1

TABLE 4

| | 0 | 0 | 1 | 2 | 3 | 4 | 5 | 6 | 7 | 8 | Movements |
|---|---|---|---|---|---|---|---|---|---|---|---|
| 1 | | 0 | 1 | 2 | 3 | 4 | 5 | 6 | 7 | | |
| 2 | | 0 | 2 | 5 | 9 | 14 | 20 | 27 | | | |
| 3 | | 0 | 3 | 9 | 19 | 34 | 55 | | | | |
| 4 | | 0 | 4 | 14 | 34 | 69 | | | | | |
| 5 | | 0 | 5 | 20 | 55 | | | | | | |
| 6 | | 0 | 6 | 27 | | | | | | | |
| 7 | | 0 | 7 | | | | | | | | |
| 8 | | 0 | | | | | | | | | |

Elements

| Proof: | | | | | |
|---|---|---|---|---|---|
| 0 | 1 | 2 | 3 | 4 | 5 |
| 11000000 | 10100000 | 0110000 | 10010000 | 0101000 | 00110000 |

Figure 2A:
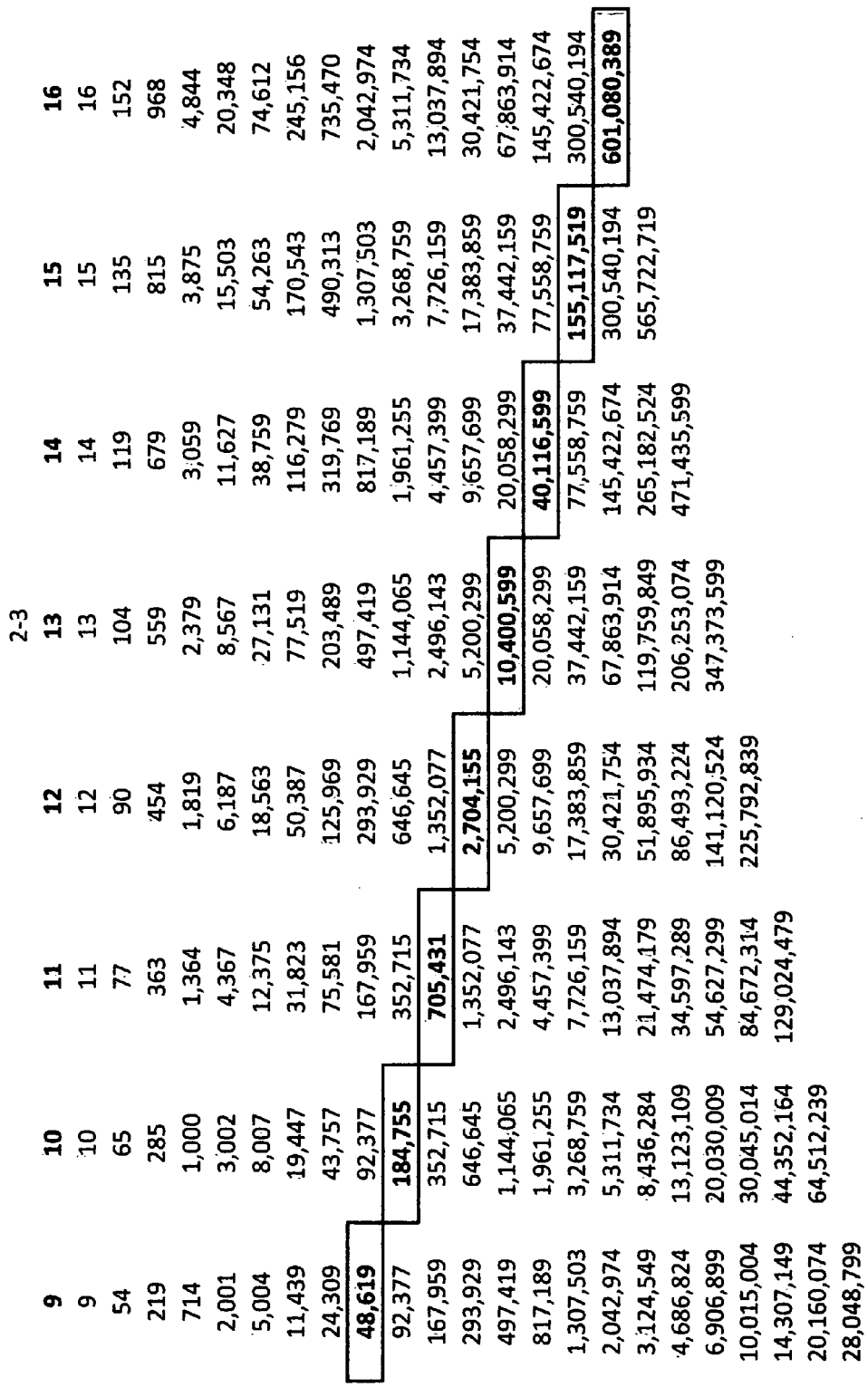
FIG. 2 is a rendering of the "Solution Values Matrix" for individual 32 bit (4 byte) blocks of digital information, described in the Detailed Description and used to facilitate the program "Engines" computations of the placement of data stream "element" locations during deconstruction and reconstruction of data streams.

View FIG. 2 and computation of maximum movement values for a 32 bit (4 byte block) of digital memory. I.E. 16 elements moving through a digital memory array (32 bits, 4 bytes) from beginning to end, has 601,080,389 movement combinations: (not including zero movement.)
11111111111111110000000000000000 to 00000000000000001111111111111111
The table may also be generated by use of the mathematical formula: $A=\{(Y+2)((Y+1)/2)(1+(Y/I))\}-1$.
Y=element(s).
I=range of movement.
A=maximum solution value for Y moving I.

Due to the symmetry of the table whereby: Example: 3 element moving 4 places and 4 elements moving 3 places are the same number of movement combinations, Y and I may be exchanged for computational purposes when desired or required. The symmetric or "mirrored" movement values occur on either side of the maximum movement's value for any digital array size where range is equal to elements. I.E. there are the same number of binary 1's as 0's in any given digital array size greater than 1. Reference FIG. 2: note bold, bracketed values.

Section III—Methodology to Compute Solution Values/Movement(s) for Individual Elements (1s)

To find the solution value for any single element (binary bit) in a 32 bit, 4 byte array there is a methodology described below:
Example: 00110001<<this element (far right, binary 1).
  a. Calculate: all elements blocked together: 00001110 with the primary (element you want the value for) moved back 1 (one) location in the binary array.
  b. The movement value from the Solutions Value table is: (34)
Proof: (3 elements moving 4)=34 movements. Table 4
  c. Add 1 movement which would render: 11000001 (per the movement methodology; placing the bit we are examining back in its original position.) The remaining elements have no movement value when they are moved back to the beginning of the binary array, therefore the "solution value" for that one, far right element (1s bit) is, 35 movements.
The (2) remaining elements movement can be calculated in a similar fashion: 2 elements moving 2 (Reference Table 4)=5. (The right most remaining elements, of the two, would move twice and the leftmost element would move 3 times. Table 4

Larger digital information array individual bit location values can be computed using the same methodology for any size/length array with any number of elements present, as desired.

The invention does not physically or programmatically move elements to determine deconstruction valuation or solution values. All movement computations are done using integer mathematics.

Section IV—Programmatic Deconstruction Process and Methodologies—Simple.

Current embodiment of the invention is rendered using a 32 or 64 bit processor capable of using a small subset of the machine code instructions found embedded in common, personal desktop and laptop computers.

1. Generate a "Solutions Value Matrix" index able by the deconstruction/reconstruction engine.
2. Generate, in computer memory, a raw data stream input buffer; a temporary holding buffer; an output buffer: of equal length, sufficient in size to accomplish the processing desired. The buffer sizes are tunable to the desired size in regard to implementation.
3. Generate an Element Count Memory Buffer, ¼ the size of the raw data stream input buffer.
4. Read (partial or full depending on buffer sizes allocated in step 2.) a random raw data stream from storage or transmission device into the raw data stream memory buffer.
5. Parse through the raw data stream memory buffer, accessing the following Table 5 values for each Byte of data to determine the "Element Count" for each 8 bit byte.

TABLE 5

Element count, quick look up table for 1, 8 bit byte of digital memory.

0,1,1,2,1,2,2,3,1,2,2,3,2,3,3,4,1,2,2,3,2,3,3,4,2,3,3,4,3,4,4,5,
1,2,2,3,2,3,3,4,2,3,3,4,3,4,4,5,2,3,3,4,3,4,4,5,3,4,4,5,4,5,5,6,
1,2,2,3,2,3,3,4,2,3,3,4,3,4,4,5,2,3,3,4,3,4,4,5,3,4,4,5,4,5,5,6,
2,3,3,4,3,4,4,5,3,4,4,5,4,5,5,6,3,4,4,5,4,5,5,6,4,5,5,6,5,6,6,7,
1,2,2,3,2,3,3,4,2,3,3,4,3,4,4,5,2,3,3,4,3,4,4,5,3,4,4,5,4,5,5,6,
2,3,3,4,3,4,4,5,3,4,4,5,4,5,5,6,3,4,4,5,4,5,5,6,4,5,5,6,5,6,6,7,
2,3,3,4,3,4,4,5,3,4,4,5,4,5,5,6,3,4,4,5,4,5,5,6,4,5,5,6,5,6,6,7,
3,4,4,5,4,5,5,6,4,5,5,6,5,6,6,7,4,5,5,6,5,6,6,7,5,6,6,7,6,7,7,8

6. Sum the combined element count for every 4 bytes and place the resulting summation into the Element Count buffer.
    Example: First 4(four) bytes of the Raw Data Buffer: 69,55,0,128
    a. Element count for each of the 4, (four) bytes=3,5,0,1
    b. Total element count for the 4 byte (32 bit) raw data block=9 elements.
7. Place the 32 bit block into an open (unused) register of the computers processor.
8. Place the element count value into an open (unused) register of the computers processor.
9. Shift the 32 bit block of raw data to the right (machine instruction) while keeping track of how many times this block of information has been shifted. When the processor encounters a 1's bit, during shifting, it will generate a carry flag, informing the software deconstruction engine (program), it has encountered a 1s bit.
    The value of that single bit is computed as described and depicted in Section III—Methodology to Compute Solution Values/Movement(s) for Individual Elements (1s) and added to a temporary holding processor register which will be used by the deconstruction engine program as a scratchpad to sum all movements of all element encountered for the block of raw data being processed.
10. The processor element counter register is incremented and the movement values ascertained in the same manner for all bits encountered during the shifting process. The values are summed with previously encountered element movement values as they are located for each element present in the raw data stream, forming a "Solution Value" for the deconstruction of the raw data stream block of 32 bits. The program may exit the process of shifting when the element count register reaches a 0 (zero) count. An index able table of values, the reverse of the element count table, may be used to further speed the process of ascertaining the solution value sum for the current 32 bit block of raw data being processed. Example: FIG. 3 (drawing)
11. The deconstruction information is stored in the output buffer in a manner disclosed in a latter section of this document.
12. The process of reading raw data and converting the raw data stream to a deconstructed output stream is continued until the entire raw data input stream is completely rendered deconstructed. The deconstructed output stream can then be, as desired by the implementation, acted upon in the same manner as the raw data input stream as many times as necessary to achieve the desired deconstructed/original data stream size ratio.
13. If further deconstruction is desired, a deconstruction counter is incremented to indicate each pass by the deconstruction engine. This counter is kept and will be used later in the header portion of the final output stream as an indicator/pointer for reconstruction of the data stream to its original size.

Section V—Programmatic Deconstruction and Reconstruction Process Example: Simple
1. Starting raw data value: 0010100101001000 Binary=10,568 Decimal (16 bit binary array size)
2. Element Count is 5: Shift right>until a 1s element is encountered. I.e. 0010100101001000
3. Compute: 5 elements (1s) moving 7 as per Section III, [0027] using FIG. 2.
4. (000000011111)=791+1 (111100000001)=792 movement value for this element.
5. Place 792 in movement solution accumulator for this block.
6. Subtract 1 from the Element Counter.
7. Element Count is 4: Shift right>until a 1s element is encountered. I.e. 0010100101
8. Compute: 4 elements (1s) moving 5 as per Section III, [0027] using FIG. 2.
9. (000001111)=125+1 (111000001)=126 movement value for this element.
10. Add 126 to previously accumulated movement values 792 (792+126=918).
11. Subtract 1 from the Element Counter.
12. Element Count is 3: Shift right>until a 1s element is encountered. I.E. 00101001
13. Compute: 3 elements (1s) moving 4 as per Section III, [0027] using FIG. 2.
14. (0000111)=34+1 (11000001)=35 movement value for this element.
15. Add 35 to the previously accumulated movement values (918+35=953).
16. Subtract 1 from the Element Counter.
17. Element count is 2: Shift right>until a 1s element is encountered. I.E. 00101
18. Compute: 2 elements (1s) moving 2 as per Section III, [0027] using FIG. 2.
19. (0011)=5+1 (10001)=6 movement value for this element.
20. Add 6 to previously accumulated movement values (953+6=959)
21. Subtract 1 from the Element Counter.
22. Element Count is 1. Shift right>until a 1s element is encountered. I.E. 001
23. Compute 1 moving 2 and add the final value to the accumulated movement (959+2=961)
24. 961 is the Total Solution Value for this 16 bit block (2 byte) random data stream.

Deconstruction Complete: 5 Elements: 961 Deconstruction/Reconstruction Solutions Value.

Section V CONT.—Programmatic Deconstruction and Reconstruction Process Example: Simple
Start: 5 element: 961 solution value: 16 bit fixed binary array size.
1. Compute: 5 moving 10: 0000000000111110 as per Section III, [0027] using FIG. 2.
2. Add 1 to computed movement value of 3002. (3002+1=3003) 1111000000000001.
3. Attempt subtraction: 961-3003. Carry generated (CG): Element cannot belong in computed location.
4. Continue computation decrementing range by 1 until calculated movement is smaller or equal to 961.
5. Compute 5 moving 9=2002 (total) (CG): Compute 5 moving 8=1,287(CG): Compute 5 moving 7=792.
6. 961-792=169: no carry generated: Element belongs at this location. 0000000000001000
7. Subtract 1 element from count. 5-1=4: Subtract 792 from total solution value. 961-792=169.
8. Element count is now 4: Remaining solution value=169.
9. Continue process: 4 moving 8=495(CG): 4 moving 7=330(CG): 4 moving 6=210(CG): 4 moving 5=126.
10. 169-126=43: no carry generated: Element belongs in this location. 0000000001001000.
11. Subtract 1 element from count. 4-1=3: Subtract 126 from remaining solution value. 169-126=43.
12. Element count is now 3: Remaining solution value is 43.
13. Continue process: 3 moving 6=84(CG): 3 moving 5=56 (CG): 3 moving 4=35.
14. 43-35=8: no carry flag generated: Element belongs at this location. 0000000101001000.
15. Subtract 1 element from count. 3-1=2: Subtract 35 from remaining solution value: 43-35=8.
16. Element count is now 2. Remaining solution value is 8.
17. Compute 2 moving 5=21(CG): 2 moving 4=15(CG): 2 moving 3=9: 2 moving 2=6.
18. 8-6=2: no carry flag generated: Element belongs at this location. 0000100101001000.
19. Subtract 1 element from count. 2-1=1: Subtract 6 from remaining solutions value: 8-6=2.
20. Element count is 1(one): Remaining solution value is 2.
21. Compute 1 moving 3=3(CG): compute 1 moving 2=2.
22. 2-2=0: no carry generated: Element belongs at this location: 0010100101001000.=10,568 Decimal.

No elements to place: No remaining solution value: Reconstruction complete.

Section VII—"TUNABILITY" of Deconstruction/Reconstruction Engine: Tables: Figures: Direction: Element Type The Deconstruction/Reconstruction "Engine" (DRE) or program design is both flexible and scalable.
1 FIG. 2. The "Solution Values Matrix" can be scaled to include any values necessary to compute any solution value for any given element count, for any given array size. The mathematical formula can perform the same function.
2. Table 5. The "Binary bits per byte" array can be scaled to include multiple bytes as desired by design implementation.
3. The DRE can be modified to process digital information blocks in reverse order (left to right instead of right to left.)
4. The DRE can be modified to process blocks of digital information using the opposite element type: (binary 0s instead of binary 1s. or any other type of element where element position solution values are desired.)
5. The DRE can be scaled to deconstruct and reconstruct any sized binary array block size found practical to use as determined by the hardware/software implementation.

6. The DRE can be used in single, multiple or parallel processors as desired/required by design implementation.

7. The DRE can be modified/scaled to be used in any digital environment found practical for the intended application as long as the basic methodologies and formulas are used to completely cover all possible combinations of incoming raw digital information streams.

Section VII—Properties of the "Solution Values Matrix" and Mathematical Formula—FIG. 2, Drawing An in-depth understanding of the "Solutions Values Matrix" is necessary to completely understand and reconstruct the methodologies and formulas present in the invention.

During raw data input file deconstruction of a 32 bit (4 byte) block, the maximum solution value will never become larger than 601,080,389: FIG. 2, drawing, which is 16 elements moving 16 places across the input stream linear array, 32 bits in length. In binary, this value is 30 bits long: 10 0011 1101 0011 1100 0010 0100 0101. A practitioner in the art of computer science will recognize that this value is 2 binary bits smaller in size than the maximum value normally associated with 32 bits (4 bytes) of 4,294,967,295 or (11111111111111111111111111111111) binary. This maximum of all possibilities encountered in random raw data stream blocks 32 bits long, renders only a 2 bit savings in size. The element count requires additional binary bits in addition to the "solution value" than can be rendered in the remaining 2 bits.

To alleviate this problem, 3 (three) variables must be considered.
1. The number of same type elements in the 4 byte, (32 bit) block of raw input data.
2. The deconstruction "solution value".
3. The fixed block size (for this example) of 4 bytes (32 bit linear binary array.)

The $3^{rd}$ variable is fixed (for this example) which leaves only 2 variables to examine.
1. Element count.
2. Solution value.

The Element Count has a direct relationship with the solution values rendered for a given raw data stream block.

The DRE operates by locating binary elements in the data stream and assigning them a "value of movement/placement" or solution value for each binary (1) encountered. The Solution Values Matrix is a table designed to be indexed, which renders values for the maximum possible movement for a given possible combination of elements in a given size array. The independent placement values assigned to each element is based on "array density" of the type of element being deconstructed.

It should be noted, low densities of a same type element in the binary array and high densities of a same type element in the binary array yield smaller "Total Solutions Values" than element densities where the binary array contains equally distributed binary 1s and 0s. The reader should also note: Due to the "Top Down" methodology (The methodology of deconstruction/reconstruction of raw data streams from right to left.) the movement/placement valuation of same element types is increased according to density and range.

Example of low/high element densities: Table 4 and FIG. 2.
0000000000001=1 (one) element: placement/moving valuation=11.
011111111111=11 elements: placement/moving valuation=11.

Example: Same element type density with increased movement/placement range. Table 4 and FIG. 2

0000111=3(three) elements: placement/movement value total=34.
00000111=3(three) elements: placement/movement value total=55.

The "Solution Value Matrix" is constructed by a systematic numeric methodology which renders a precise relationship between all values generated. Section II, Table 4 [0024]. This relationship is based on element count density and range which render solution values. The values in the "Solution Values Matrix" are generated, systematically, with a progression of combinations defining maximum same type element placement/movement possibilities given X element density in Y, given range. The values in the matrix grow in exact proportion to element density in relation to the movement methodology described at [0016], Table 1.

The "Solutions Table Generation" exactness of design and relationship of growth allows for a methodology to be introduced whereby smaller total solution values may be rendered, calculated during deconstruction.

High density element counts and low density element counts render the smallest total solution values. Therefore, our variables: Element Count and Solution Value need to be "skewed" to render a smaller digital memory output stream footprint, at maximum solution values, than the original raw input data stream.

At the start of processing part or all of the raw random data stream, the element count for the data block(s) are derived. Table 5, [0030] The element count is "known" by the deconstruction program before the search for binary bits (1s) is undertaken. The program also examines the far right side of the raw data stream block for density. The combination of element count and density at the far right side of the raw input data block, force the program to make a decision: Does this combination of density and range require that the "skew" methodology be invoked? This is computed by an AND instruction (computational processor instruction.) The right side, top part of the raw data stream block density is determined in relationship to total element density. (Is there a high density of X and enough elements, where it is easily computed; will the Total solution value for this block be larger than desired?)

Example: FIG. 1
The far right side byte (top) of raw binary data stream=01100010 and the total element count is 16. The computer ANDs that value with 00011111 and returns the value: 00000010. From this value, the computer can index the solution value matrix and compute the placement value for that one (1) bit, (16 elements moving 14)+1=145,422,674 or 1000 1010 1010 1111 1001 0101 0010 binary (28 bits.) The computer program (engine) will then compare this values size with a simple subtraction from a fixed value. If the subtraction results in a carry being generated (resulting in a negative value after subtraction.) the computer program will enter a binary 1 (one) into a Boolean skew flag holder and branch to a section of the programs engine which invokes the "Skew Methodology".

Section VIII—The Skew Methodology Overview.

The decision to skew the element count to render smaller solution values is "tunable". The decision making branch of the computer to skew or not to skew can be adjusted in a range that delivers a Total Solution Value that fits in a predetermined binary block size in the Deconstruction output stream.

Due to the nature and generation methodology of the Solution Value Matrix and the relationship of all elements to one another, the engine can use smaller or larger computational indexes to achieve the desired total solution value output size for X elements in a raw digital information block, if the below, disclosed methodology is followed. This is accomplished by making a "Skew" decision, as noted above, which sets the skew part of the DRE into "skew" mode.

The 2 (two) variables the skew works on are the Element Count and Total Solution Value for a block of raw input data. If the element count and input array density would render a Total Solution Value larger than desired, the Skew Flag is set; the element count is duplicated in a processor register and a value, determined by the implementation programmer/designer, is added to the duplicated Element Count. The DCE will process the raw input binary block as if the Element Count were the Real Element Count, thus "skewing" the indexing into the Solution Value Matrix for every element encountered, rendering a smaller Total Solution Value for that block. During this process the value added to the element count is removed by a systematic methodology described below.

The main purpose of the "Top Down" (right to left) processing of elements in the random raw input data stream is to force the DCE to process what it finds, (1's) elements, on blind faith. At the start of processing a raw digital input block, the program is aware of how many elements (1's) it has to process [0030] Table 5, but not where they are located due to pre-gathering/pre-calculation of the Element Count for each raw random input stream block. [0040]-[0044]

Skewing the Element Count before Deconstruction of the raw random input data stream block has the effect of decreasing the movement/placement value for each element located in that block, thereby decreasing Total Solution Value size which in effect, reduces Deconstruction output block size.
Simple Example of Skew: FIG. 2.
00000000000000001111111111111111: 16 elements (1s) in a 32 bit, 4 byte binary block.
16 elements placed at the far right side of a digital 32 bit array would require the Total Solution Value be equal to: 601,089,389. This value, in binary, uses 30 bits of computer memory: almost 4 Bytes. (Compute 16 moving 16.)
00001111111111111111111111111111: 28 elements (1s) in a 32 bit, 4 byte binary block.
28 elements placed at the far right side of a digital 32 bit array would require the Total Solution Value to be equal to: 35,959. This value, in binary, uses 16 bits of computer memory: 2 Bytes. (Compute 28 moving 4.)

Section IX—The Skew Methodology Description, Example and Detail.

The skew methodology renders smaller deconstruction total solution values which in turn, renders smaller deconstruction output stream blocks. The "skew" can be as simple as defining that every element count that is greater than a specific element count and density, use a false element count of 29.
Skew Method Description:
When the element count and density distribution will exceed desired output stream size limitations, imposed by the program designer, a section of the DCE (program) gets "lied" to in a systematic manner about how many elements are in the raw data stream and the "lie" (skew) flag is set. The DCE processes the information as if the "lie" were true using a special skew process that uniformly and systematically nullifies the "lie". The end result of deconstruction is a TRUE element count, a "Skew Flag" (1 binary bit) and a FALSE Total Solution Value being output into the deconstruction data stream. The output data is smaller than the original input data. Since the output stream is always smaller than the original input stream, the deconstructed output stream blocks can be concatenated. The concatenated output stream can be reprocessed as if it were a new input stream, recursively.

The deconstructed output stream is rendered:
1. 1 (one binary bit, Skew Flag) 0=no skew: 1 equals a skewed ("lied to") data block.
2. True element count
3. "Skewed" or not skewed Total Solution Value for the data block.

Upon reconstruction, the DRE recognizes the skew flag(s), and "lies" to the reconstruction part of the program in the same method the deconstruction engine did during deconstruction of the data stream. The reconstruction engine uses the same "Top Down" (right to left) methodologies as the deconstruction engine to rebuild the data stream thereby reconstructing the original data stream in its' entirety.

For simplicity and ease of understanding, the example below uses a small 8 bit byte.
Simple Normal and Skew Process Examples:
Normal Process: Element Count 4: Skew flag NOT set.
1. Input data block=00001111
2. Compute: 4 moving 3+1=35: 00001111: Decrement TRUE element count.
3. Compute: 3 moving 3+1=20: 00001111: Decrement TRUE element count.
4. Compute: 2 moving 3+1=10: 00001111: Decrement TRUE element count.
5. Compute: 1 moving 4=4: 00001111: Decrement TRUE element count.
6. TRUE element count is 0. Done processing.
Total Solution Value=69 Decimal, 100 0101 Binary. (Memory footprint=7 bits.)
Skewed Process: Element Count of 4. Make it 6: Skew flag SET.
1. Input data block=00001111
2. Compute: 6 moving 1+1=7: 00001111: Decrement TRUE element count.
3. Compute: 5 moving 1+1=6: 00001111: Decrement TRUE element count.
4. Compute: 4 moving 1+1=5: 00001111: Decrement TRUE element count.
5. Compute: 3 moving 1+1=4: 00001111: Decrement TRUE element count.
6. TRUE element count is 0. Done processing.
Total Solution Value=22 Decimal, 1 0110 Binary. (Memory footprint=5 bits.)
Complex Skew, Programmatic Methodology
The Skew Methodology systematically decreases the True Element Count and the False or Skewed Element Count in the following manner during the deconstruction process.

Before deconstruction of an input data stream block begins, the TRUE element count is known [0030]. The program uses a simple methodology to determine if the data block needs to be "Skewed" [0043]. If the block needs to be skewed, the Skew Flag is set to 1(one); the skew index offset computed (skew offset is "tunable" depending on processor register size and desired "skew offset" which relates directly to the concatenation of the deconstruction output stream.) as practical and desired for the implementation and the search for binary is (ones) in the data stream block begins. When the first binary 1 is encountered (far right, top down processing.), a second "Take away flag" is set indicating to the deconstruction engine, from this point on: decrement the True Element Count by 1 each time a binary one is encountered and decrement the False Element Count by 1 each time a binary 1(one) OR a binary 0(zero) is encountered. This methodology in effect, forces the True Element Count and the False Element Count to become equal at some point during deconstruction which signals the process to ignore False Element Count and the "Take away flag" entirely and process the remaining elements in a normal, non-skewed manner. The point at which the True Element Count and False Element count becomes equal, varies due to the possible combinations encountered.

Before reconstruction of a deconstructed data stream block begins, the True Element Count is known; the Skew Flag is examined and noted; the Total Solution Value is known. If the Skew Flag is a 0(zero) the DRE processes the input block and reconstructs the output stream in a normal manner. If the Skew Flag is set 1(one) the skew offset is calculated and noted; the False Element Counter is filled with the skewed element count and the reconstruction processing begins using the same tables and methodologies used in the deconstruction process. The False Total Solution Value is used to rebuild the deconstructed input data stream, utilizing the "top down", "Take away flag" and decrements the True Element Count value and False Element Count value using the exacting methodology described at [0055].

It should be noted: Many combinations of raw data element stream input block do not need to be skewed.

EXAMPLE 1

1111111111111111000000000000000 is equal to 16 element with no solution movement/placement.

If there is no movement or the Total Solution Value become equal to 0(zero) during reconstruction, the remaining element(s) have no movement/placement value and simply fill the bottom (far left) portion of the binary array. During Deconstruction: if the element(s) are at the far left side of the array, as in this example, they have no movement factor and therefore do not add to the Total Solution Value.

Deconstruction output value=16 element with 0 solution value movement.

EXAMPLE 2

11110100000000000000000000000000 is equal to 5 elements with a Total Solution value of 1(one).

The lead, far right 1s element has a placement value of 1(one) movement. After the 1 movement is subtracted from the Total Solutions Value, there are no additional movements possible, thus the remaining 4 elements cannot move and are logically placed at the far left side of the output binary array, in the same manner as would be computed if the input value were determined as 11100000000000000000000000000000. (4 moving 0(zero)).

It should also be noted: The larger the input stream block processed, the greater the skew can be. The invention scales to wider capacity processors (64 bit, 128 bit or "in memory", program defined block size, etc.) whereby: The Solution Values Matrix can be larger: The Skew offset can be larger where the Total Solution Value for each block of data is rendered exponentially smaller in the output stream. If the True Element Count is rendered in normal binary for a combination of 64 bits, the maximum True Element Count, output into the deconstruction stream, is only increased by 1(one) bit. However, larger block processing allows for larger skewing of the indexes into the Solution Value Matrix, rendering exponentially smaller Total Solution Values.

EXAMPLE

32 Elements Count: Requires 6 bits of memory output stream: 64 Element Count: Requires 7 bits.

Section XI—Simple Methodology to Make the True Element Count Smaller, Decreasing Output Stream Size.

If the desired implementation (dependent on; program design operating speed; predetermined concatenated output stream size.) the implementer/designer may use this methodology to gain additional space in the output/input stream.

Logic Example: 0(zero) elements moving=0 (zero). If the True Element Count is 0(zero) and the Total Solution Value is 1(one) since it is impossible to mover 0(zero), 1(one) movement, the 1 movement can be construed by the program to have a new meaning. (there are more than 0(zero) elements). Therefore a simple table can be included which designates:

1. 0(zero) elements and 0(zero) solution value means what it implies.
2. 0(zero) element and 1 thru 32 solution value means: 1(one) element moving, 0 thru 31 places.
3. 0(zero) element count and 33 through 528 solution value means: 2(two) elements moving 0 through 495 places.

This process of logic allows for all 32 True Element Counts to fit into 0-14 decimal or 1110 binary, saving 2 (two) bits) in the output stream for each block of processed data; leaving the value 15 decimal, 1111 binary open to use for any additional process the implementer desires. This methodology is also "tunable" and expandable for processing larger input data stream blocks, further reducing deconstruction output streams.

Section XII—Concatenation Process

As the raw data stream binary input blocks are deconstructed, the resulting smaller output stream values will take up a smaller memory foot print size in the deconstruction output stream. The output stream size can be "tuned" by the various methods disclosed in this document. The preferred embodiment, for speed of execution and simplicity of design, may be adjusted to render the output stream in blocks of memory which are automatically deemed concatenated by design.

Example: If the implementer uses a 32 bit processor and tunes the DRE to process 4 byte blocks of the input stream and output uniform 3 byte blocks contiguously, the deconstruction process can reprocess the newly created deconstruction stream as if it were a new raw data input stream and continue to process 4 byte blocks of information in the same manner, the difference being, the DRE will have 25% less information to process, per pass. If the implementer desires to tune the DRE to concatenate in another manner, for any practical purpose, simple known methodologies for shifting binary bits or masking them off for concatenation can be employed.

Section XII Fixed Skew, Resolution Table, Scalable to Processor and Memory.

Depending on implementation desired, a fixed "skew" and large Skew Resolution Table memory array methodology can be used to speed the deconstruction/reconstruction of the input binary stream, lessening processor load in the process. This methodology is processor "friendly" and memory intensive rendering exponential speed increases in program execution times compared to like processor capabilities with less memory.

Fixed "skew" Methodology for Deconstruction: All element counts between a specific range with a high enough density [0048] whereby the skew offset into the Solution Value Matrix methodology is invoked and rendered in an index able memory table (or rendered in fixed ram/rom hardware) in advance of the deconstruction process. This methodology requires the computation of all possible element placement/movement combinations for a block of fixed size. (I.E. . . . 24, 32, 48 bits . . . etc.) The non-skewed placement/movement values are also included in the Skew Resolution Table for index able speed of process. The index able Skew Resolution Table can be used to recover deconstruction element counts and skewed Total Solution Values by simple comparative indexing of an input stream block value against the values rendered in the pre-defined Skew Resolution Table.

Fixed "skew" Methodology for Reconstruction: The Reverse Skew Resolution Table memory array methodology works in exactly the opposite manner as the Fixed "skew" Methodology for Deconstruction. As the reconstruction part of the DRE parses through a deconstructed data stream, it will pull values that can be used as an index to the Reverse Skew Resolution Table. The values indexed would be the normal and skewed fully reconstructed output values for a specific block size as disclosed in [0063].

Both the Fixed "skew" methodologies have the advantage of increasing input and output stream throughput and using a tiny portion of the normal processor workload, but have the disadvantage of requiring the tables to be generated in large memory arrays. A memory array of 100 megabytes will accommodate both tables for the fixed "skew" of a 24 bit input and output data stream blocks. It would take approximately 24 Gigabytes of memory to accommodate the Skew Resolution Table and Reverse Skew Resolution Table for a 32 bit input and output data stream block.

Section XIII—Methods for Rendering the Deconstruction Stream Incomprehensible.

The deconstruction output stream can be rendered in many systematic and "tunable" ways as disclosed in this document. The original data stream information is not carried by the deconstruction output stream, thus allowing for the implementation of various methodologies to manipulate the output stream in such a manner that it becomes incomprehensible and unrecoverable by a person or persons not designated as the recipient. The designated recipient must be able to recover the original data stream, intact, without error. To accomplish this, the recipient must know how the deconstructed data stream was deconstructed.

The deconstruction process may be rendered backwards (left to right) for one or several block of information and can be programmatically implemented at any time desired. The DRE engine can be programmatically interrupted during processing and a small block of data removed from the input data stream which can be used as a key (knowing where to replace the small block of data and when (which pass) the data belongs). At any point during processing, the element count for a deconstructed block of data can be manipulated so that any attempt at full regeneration becomes futile.

The most effective manipulation of the deconstruction output data stream, making it incomprehensible, occurs when the implementer determines no additional deconstruction Is needed.

Methods:
1. Do not specify In the header information, what type of program is needed to access the file. This method necessitates the systematic loading of the regenerated file stream into multiple program types in order to recognize an intelligible output.
2. Modify the: True Element Count(s); Skew flag(s); Total Solutions Value(s) in any of the final blocks of the deconstructed output file/stream or the deconstruction pass counter, rendering a file/stream impossible to reconstruct accurately.
3. Change the order of deconstruction programmatically, necessitating a specific set of programmatic directions to reconstruct the original data stream.
4. Create a "key" by removing or adding information from the deconstructed data stream at any time during or after the deconstruction process.
5. Modify the deconstructed output stream by reversing the order of any desired combination of bits.

Any concerted effort which modifies the deconstruction output stream will render the deconstructed output stream incomprehensible with no method known to this inventor of retrieving the original data stream intact.

Section XIV—File Header Design

The current implemented file/stream header consists of the following:
1. 1(one) Byte: 8 Boolean binary status flags:
   Bit 7: value 0=recursion pass count used: 1=original input file sized used for reconstruction.
   Bit 6: value 0=checksum methodology not used: 1=Checksum methodology used.
   Bit 5: value 0=deconstructed file size is less than 255 bytes (after header, file name and recursion/file size values): 1=Greater than 256 characters. (for files that are deconstructed to a given size.)
   Bit 4: value 0=binary element is (ones) deconstruction: 1=binary element 0s (zeros) deconstructed.
   Bit 3: value 0=deconstructed right to left: 1=deconstructed left to right
   Bit 2: value 0=complete deconstructed file: 1=partial file (as desired for sectioning very large data streams)
   Bit 1: value 0=rendered normally: 1=rendered incomprehensible.
   Bit 0: undefined (reserved)
1. 1(one) Byte: specifying the length of the file name.
2. X bytes rendering the original file name (up to 256 characters)
3. Two Bytes: specifying the checksum value (if used)
4. One or two bytes (see bit 5 above.) file size after header and file name.
5. 5 bytes fixed: Either original file size or recursion pass count. See bit 7 above.
6. 1 byte deconstructed bit remainder count if pass count used for reconstruction. See 7 above.

The implementation of the methodologies disclosed will render deconstructed and reconstructed digital data information streams whereby:
a. The 1 Boolean bit (skew flag) can be thought of as a "tools guide" which tells the computer program which programmatic tools to use to complete the task(s).
b. The Element Count can be thought of as a "materials list", specifying how many of same type elements belong in a binary array block of given size.
c. The Total Solutions Value can be thought of as a "blueprint", specifying where the materials (b) belong in the data stream.

I claim:

1. A systematic methodology to deconstruct digital data information streams comprising:
   a processor executing the steps of:
   (a) generating a sequential methodology which renders all combinations of placement/movement values for binary 1s (ones) or binary 0s (zero) elements contained in a linear computer memory array;
   (b) generating an indexable computer memory matrix, resembling FIG. 2, which consists of values derived from (a) which can be used to render movement/placement solution values for single and multiple element(s) in a binary array or block of digital information data stream;
   (c) generating the indexable computer memory matrix which contains all combinations of the number of same type elements in a fixed size binary memory byte or any given size memory block, resembling FIG. 3;

(d) generating the indexable computer memory matrix which consists of element movement/placement values that have been predefined by using an offset of value described in (c) while indexing the matrix described in (b);

(e) defining a temporary input buffer and temporary deconstruction buffer where an input data stream and deconstruction output data stream will reside, respectively;

(f) filling the temporary input buffer with variable digital information values from an input digital information stream source;

(g) filling a temporary holding memory buffer with summed element count values indexed from matrix (c) for a group of binary bytes located in the temporary input buffer described in (e);

(h) analyzing a count and density of binary elements in a series of binary input buffer bytes to determine the manner in which the matrix described in (b) will be indexed to render temporary movement/placement counts until processing of the input data steam is complete and a total solution value output stream including setting a skew flag represented by a Boolean bit noting decision branching used to control program flow and achieve optimal program execution on the input data stream being processed;

(i) indexing a fixed skew, pre-generated matrix described in (d) and render temporary solution values from the indexed locations which is based on the previous (h) decision making analysis;

(j) indexing the matrix determined by (h) and described in (b) to mathematically compute/sum the temporary solution values for all same type elements in a digital information input stream;

(k) rendering a smaller element count by invoking a logical sequence of calculations or indexing a pre-defined, pre-calculated memory matrix which outlines and defines the real element count when impossible movement/placement values are generated by element count and temporary solution value combinations;

(l) rendering a Boolean bit program control flag described in (h) and embedding the control flag for program decision processing into the deconstruction output data stream generated and described in (e), along with the same type element count and temporary solution value into the deconstruction output data stream;

(m) incrementing a recursion pass counter;

(n) determining if the deconstruction output data stream is of the size desired by implementation and if not, recursively reprocessing the deconstruction output data stream as if it were an unprocessed input data stream until the desired deconstruction output data stream size is attained or an encryption level desired is attained;

(o) modifying the deconstruction output data stream to render the deconstruction output data stream incomprehensible with or without a numeric key made from binary bits removed from or added to the deconstruction output data stream in any order, at any location in the deconstruction output data stream, during any recursive pass as desired and implemented at user discretion;

(p) generating a header for the deconstruction output data stream which describes the deconstruction output data stream well enough to enable reconstruction of the original input data stream at a later time; and (q) appending the deconstruction output data stream to the header (p) and outputting the completed deconstruction information to a digital device used for storing and/or transmitting digital information.

2. The systematic methodology to reconstruct digital data streams, processed by the methodologies in claim 1, for the purpose of regenerating original data streams, the processor executing the steps of:

(1) generating a sequential methodology which renders all combinations of placement/movement values for binary 1s (ones) or binary 0s (zero) elements contained in the linear computer memory array as described in claim 1(a);

(2) generating an indexable computer memory matrix which consists of values derived from claim 1(a), which is used to render movement/placement solution values for single and multiple element(s) in a binary array or block of digital information;

(3) generating an indexable computer memory matrix which consists of element movement/placement values that have been predefined by using values while indexing claim 1(b) matrix which will render cross indexed values;

(4) defining the temporary input buffer and temporary deconstruction buffer where an input data stream and deconstruction output data stream will reside, respectively;

(5) reading and parsing a deconstructed file header to ascertain deconstruction information;

(6) filling the temporary input buffer with variable digital information values from an input digital information stream source;

(7) reading a Boolean bit (0 or 1) to determine program decision branching from a deconstructed digital information input stream data source to determine program reconstruction flow;

(8) reading an element count and total solution value and determine true element count from a deconstructed digital information input stream data source;

(9) indexing a pre-generated reverse lookup matrix as described in (2) to ascertain reconstruction element and solution values and output the result to an output reconstruction digital data stream;

(10) Adding a predetermined deconstruction key or methodology as described in claim 1(o) to render the reconstructed output stream intelligible;

(11) Numerically computing a movement/placement value for each same type element in a deconstructed data stream by indexing a memory matrix composed of pre-generated, predetermined movement values as described in claim 1(d);

(12) Subtracting a movement/placement solution from a total solution value;

(13) Systematically moving the reconstructed data blocks to a temporary output memory buffer;

(14) decrementing a recursive pass counter; and

(15) Reclusively reprocessing the temporary output memory buffer as directed by (6-14) until reconstruction is complete.

* * * * *